United States Patent [19]
Whitehead

[11] Patent Number: 5,732,077
[45] Date of Patent: Mar. 24, 1998

[54] RESOURCE ALLOCATION SYSTEM FOR WIRELESS NETWORKS

[75] Inventor: James F. Whitehead, Bellevue, Wash.

[73] Assignee: Lucent Technologies Inc., Murray Hill, N.J.

[21] Appl. No.: 608,164

[22] Filed: Feb. 28, 1996

Related U.S. Application Data

[60] Provisional application No. 60/006,636, Nov. 13, 1995.

[51] Int. Cl.$^6$ ................................. H04B 7/204
[52] U.S. Cl. ............... 370/349; 370/913; 455/69; 455/116; 455/522
[58] Field of Search ................. 455/50.1, 54.2, 455/63, 68, 69, 116, 509, 522; 375/377; 370/310, 347, 349, 546, 913

[56] References Cited

U.S. PATENT DOCUMENTS

| | | | |
|---|---|---|---|
| 5,003,619 | 3/1991 | Morris et al. | 455/69 |
| 5,241,690 | 8/1993 | Larsson et al. | 455/116 |
| 5,333,175 | 7/1994 | Ariyavisitakul et al. | 455/69 |
| 5,450,616 | 9/1995 | Rom | 455/69 |
| 5,455,964 | 10/1995 | Roos et al. | 455/69 |
| 5,553,316 | 9/1996 | Diepstraten et al. | 455/69 |
| 5,564,075 | 10/1996 | Gourgue | 455/69 |

FOREIGN PATENT DOCUMENTS

| | | | |
|---|---|---|---|
| A-565507 | 10/1993 | European Pat. Off. | H04B 7/005 |
| A-0 579 372A2 | 1/1994 | European Pat. Off. | H04B 7/005 |
| WO 93/07702 | 4/1993 | WIPO | H04L 27/30 |

*Primary Examiner*—Benedict V. Safourek
*Attorney, Agent, or Firm*—Frederick B. Luludis

[57] ABSTRACT

A system is designed to allow collision to be avoided in a wireless local area network environment through the exchange (between a transmitting station and an intended receiving station) of handshake information that includes power level control signals indicative of power levels at which the sending and receiving stations are allowed to operate in order a) to avoid causing interference with communications between other stations, and b) to prevent other stations from causing interference in subsequent communications between the sending and receiving stations.

37 Claims, 3 Drawing Sheets

| SENDER | RECEIVER | 3rd PARTY |
|---|---|---|
| ISSUE REQUEST=(SEND_ID RECEIVE_ID LENGTH CURRENT_POWER NET_MAXIMUM_POWER) | MEASURE RECEIVE LEVEL (2) | |
| | CALCULATE SENDER RECEIVER PATH GAIN MEASURE AMBIENT INTERFERENCE LEVEL DECIDE IF PACKET CAN SUCCEED WITHIN NET_MAXIMUM_POWER IF NOT STOP DECIDE POWER AND CALCULATE MAXIMUM ALLOWED INTERFERENCE | |
| SEND PACKET AT PRESCRIBED POWER | ISSUE PERMIT (SEND_ID RECEIVE_ID LENGTH CURRENT_POWER PRESCRIBED_POWER MAX_INTERFERENCE) | MEASURE RECEIVE LEVEL CALCULATE RECEIVER-3rd PARTY PATH GAIN (5) CALCULATE MAXIMUM_POWER TO AVOID MAX_INTERFERENCE AT RECEIVER ADD MAXIMUM_POWER AND EXPIRATION TIME TO POWER CONSTRAINT LIST AND UPDATE ITS OWN NET_MAXIMUM_POWER |
| (END OF PACKET) | ISSUE ACK | |
| (SUCCESS) | (END OF ACK) | POWER CONSTRAINT EXPIRES SO REMOVE IT FROM LIST AND UPDATE NET_MAXIMUM_POWER |

REQUEST SUB-FIELDS

- 10 SEND_ID
- 10 RECEIVE_ID
- 6 LENGTH
- 6 CURRENT_POWER
- 6 NET_MAXIMUM_POWER
- 38 TOTAL

PERMIT SUB-FIELDS

- 10 SEND_ID
- 10 RECEIVE_ID
- 6 LENGTH
- 6 CURRENT_POWER
- 6 PRESCRIBED_POWER
- 6 MAX_INTERFERENCE
- 44 TOTAL

FIG. 4

| SENDER | RECEIVER | 3rd PARTY |
|---|---|---|
| ISSUE REQUEST=(SEND_ID RECEIVE_ID LENGTH CURRENT_POWER NET_MAXIMUM_POWER) | MEASURE RECEIVE LEVEL (2) | |
| | CALCULATE SENDER RECEIVER PATH GAIN MEASURE AMBIENT INTERFERENCE LEVEL DECIDE IF PACKET CAN SUCCEED WITHIN NET_MAXIMUM_POWER IF NOT STOP DECIDE POWER AND CALCULATE MAXIMUM ALLOWED INTERFERENCE | |
| | ISSUE PERMIT (SEND_ID RECEIVE_ID LENGTH CURRENT_POWER PRESCRIBED_POWER MAX_INTERFERENCE) | MEASURE RECEIVE LEVEL CALCULATE RECEIVER-3rd PARTY PATH GAIN (5) CALCULATE MAXIMUM_POWER TO AVOID MAX_INTERFERENCE AT RECEIVER ADD MAXIMUM_POWER AND EXPIRATION TIME TO POWER CONSTRAINT LIST AND UPDATE ITS OWN NET_MAXIMUM_POWER |
| SEND PACKET AT PRESCRIBED POWER | | |
| (END OF PACKET) | ISSUE ACK | |
| (SUCCESS) | (END OF ACK) | POWER CONSTRAINT EXPIRES SO REMOVE IT FROM LIST AND UPDATE NET_MAXIMUM_POWER |

RESOURCE ALLOCATION SYSTEM FOR WIRELESS NETWORKS

CROSS-REFERENCE TO RELATED PROVISIONAL APPLICATION

This application claims the benefit of the Nov. 13, 1995, filing date of Provisional Application Scrim No. 60/006,636 entitled "Resource Allocation System for Wireless Networks".

TECHNICAL FIELD

This invention relates to communications systems and more specifically to a method and a system for allocating resources in a wireless communications network.

BACKGROUND OF THE INVENTION

Overlapping transmissions of information addressed to the same device by two or more other devices that share a common communications path is a well-known communications system issue. In wired and single-cell wireless networks, it is generally desirable to avoid overlapping transmissions because collisions or interferences that result therefrom degrade the performance of these networks. Among the numerous solutions proposed to address this issue for Local Area Networks (LAN), perhaps the best known and the most commercially successful solution is the Carrier Sense Multiple Access (CSMA) medium access control (MAC) protocol that is used primarily for Ethernet-based wired Local Area Networks (LAN). The CSMA protocol requires a station that shares a common facility with one or more other station, to attempt detection of a carrier before initiating transmission. The carrier detection process operates to temporarily inhibit transmission by a sending station while another station is sensed to be transmitting. Implementation of the CSMA protocol for a wired LAN typically requires the shared common facility to be of a given length in order to avoid the possibility that a station may not be able to detect a carrier originated from a too-far transmitting station that is sometimes referred to as a "hidden station" or a "hidden terminal".

While various kinds of measures have been devised to avoid collisions in wired and single-cell wireless networks, by contrast, in multi-cell and/or peer-to-peer wireless networks, simultaneous or overlapping transmissions that result in frequency reuse (instead of collision) are highly desirable when adequately controlled. Methods to control or manage frequency reuse include Fixed Channel Assignment (FCA) and Dynamic Channel Assignment (DCA). Despite the enormous commercial acceptance of the FCA and DCA methods for circuit-switched networks, network designers have been reluctant to use them in packet-switched networks in general and Wireless Local Area Networks (WLAN), in particular. The reluctance of system designers to use FCA and DCA techniques for wireless packet switched networks stems primarily from their concern of wasting valuable bandwidth, and their eagerness to take advantage of existing software programs and hardware designs for the CSMA protocol. Hence, in lieu of the FCA and DCA methods, proposals have been submitted to adapt the CSMA protocol to manage frequency reuse. According to those proposals, carrier sensing in a WLAN environment can be achieved by causing nearby stations to defer to a transmission in progress while distant stations are allowed to communicate between themselves without causing interference with the communications of the nearby stations. Hence, as suggested by those proposals, carrier sensing in a WLAN environment requires definition of threshold parameters that are used to classify a station as close to, or distant from, a transmission in progress. The use of the CSMA medium access control protocol in a WLAN environment has presented, and still presents a number of challenges. For example, in a WLAN environment, the shared common facility is an allocated radio frequency (RF) spectrum whose capacity is limited, but whose length is not. The inability to limit the length of the shared facility exacerbates the hidden terminal problem. In addition signal fading in a WLAN environment causes carrier sensing to "miss" a nearby terminal while raising a "false alarm" for a far-away non interfering station.

In response to these problems, techniques, such as Busy-Tone Multiple Access and Idle-Signal Multiple Access, have been proposed to minimize the impact of the hidden terminals problem in a WLAN that implements the CSMA protocol. Another technique disclosed in International Patent Application No. PCT/US94/07004, involves exchange of a short Request-to-Send (RTS) control packet that is sent by a transmitting station, and a short Clear-to-Send (CTS) control packet, that is forwarded by the intended receiving station only when the receiving station detects no competing transmission. Unfortunately, the RTS and CTS packets may be much longer than the carrier-sense detection time, thereby introducing undue latency in the network. More importantly, the transmission of the CTS packet operates to inhibit all stations that can listen to that transmission, including some stations that are so far removed that they cause no danger of interference with the subsequent packet transmission initiated by the intended receiver of the CTS packet.

Realizing that carrier sensing methods are impractical for some wireless environments, such as outdoor systems, some network designers have decided to apply the dynamic resource allocation method (heretofore used for circuit-switched networks) to packet-switched networks in general, and base-station controlled WLANs, in particular. One of these methods that is disclosed in U.S. Pat. No. 5,239,673, uses a priori interference information and relies on centrally-controlled algorithm and wired communications among base stations. Unfortunately, the requirements of central control, interconnection between base stations preclude the application of this method in peer-to-peer WLAN environments. Hence, it is a continuing problem to efficiently allocate resources in a wireless network that is suitable for use in indoor as well as in outdoor environments.

SUMMARY OF THE INVENTION

The present invention is directed to a system that manages frequency reuse and avoids collision in a wireless network through the exchange (between a sending station and an intended receiving station) of handshake information that includes data indicative of power levels at which the sending and receiving stations are allowed to function. The exchange of power levels data between pairs of receiving and sending stations accomplishes several objectives. It avoids collision by preventing many packets that would not reach their intended destination (because of interferences) from being transmitted. Because the exchange of power levels data between a pair of receiving and sending stations is broadcast over the wireless network for reception by all stations, that exchange provides information that is used by all other stations on the wireless network to avoid interfering with the communications between the pair in question without unnecessary deferrals.

In an embodiment of the principles of the invention, all stations on a wireless network are arranged to maintain a power constraint list which encodes each station's knowledge about other stations' vulnerable on-going packets. The power constraint list may be derived, for example, from path-gain measurement that is based on received-signal-strength indication (RSSI) and the advertised transmit power level in each transmitted packet.

When a sending station on a WLAN wants to transmit one or more data packets to a receiving station on the same WLAN, a REQUEST/PERMIT handshaking exchange takes place between the two stations. In that exchange, the sending and receiving stations advertise not only packet identification and packet length information, as in standard RTS/CTS, but also power levels and other interference-related information. Most important, the receiver advertises the maximum allowed interference for the expected packet. Specifically, the intended receiver of a packet determines whether the packet will be transmitted, and if so, the particular power level at which the sending station is authorized to transmit the packet(s). The receiving station knows a particular signal interference ratio that is required for successful reception of the packet based on current interference measurement that is performed by all stations, and that is predicated on information, such as received-signal-strength indication (RSSI), path-gain measurement, and the power constraint list. In accordance with the principles of the invention, the sending station is allowed to transmit a data packet only when the intended receiving station determines that the data packet can be sent at an adequate power level, and can still avoid interfering with any other packets being communicated between other pairs of sending and receiving stations.

Advantageously, implementation of the principles of the invention allows a receiving station to manage interference precisely based on information about the sender-receiver path and interference paths, thereby permitting frequency reuse to take place only where it is harmless. Moreover, a protocol implementing the principles of the invention is completely distributed and compatible with both peer-to-peer and base-station-oriented networks. In addition, a protocol implementing the principles of the invention allows the hidden terminal problem to be solved for indoor wireless networks. For outdoor wireless networks, the same single channel can be used at every base station to provide service economically when demand does not justify more than the single, shared channel. Furthermore, a protocol implementing the principles of the invention is self-organized, thereby avoiding the need for parameter setting and corresponding opportunity for error.

BRIEF DESCRIPTION OF THE DRAWINGS

In the drawings:

FIG. 4 is a table that shows the different instructions executed by the different elements in FIG. 1 or FIG. 2 to implement the principles of the invention.

DETAILED DESCRIPTION

Figure 1:
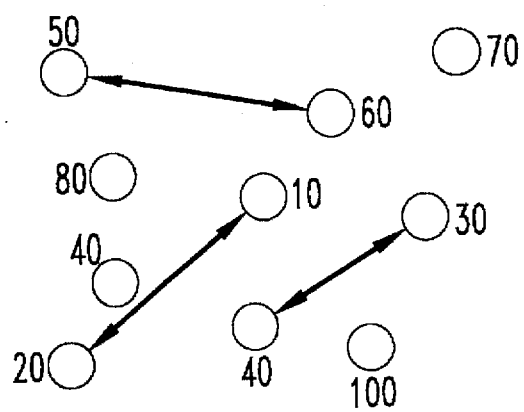
FIG. 1 shows an illustrative representation of a peer-to-peer wireless network that is arranged to implement the principles of the invention.

FIG. 1 is an illustrative representation of a peer-to-peer wireless network that is arranged to implement the principles of the invention. The network of FIG. 1 shows ten stations depicted as circles that are arranged to communicate with each other over a single (frequency) wireless channel. For example, active communications may take place simultaneously between the pairs of stations 10 and 20, 30 and 40 and 50 and 60. Stations 60-100 actively listen to the communications between the pairs of stations while they are in an idle state. Specifically, stations 60-100 use the idle time to collect information for use when they need to transmit their own data packets (as explained below). Types of information exchanged between pairs of stations 10 and 20, 30 and 40 and 50 and 60 include data packets and signaling packets. Data packets transmitted between pairs of stations may be of any length and typically carry payload information or user data. By contrast, the signaling packets are short packets that are used for handshaking operations between each pair of stations. The signaling packets are transmitted in-band, i.e., using the shared (frequency) wireless channel. Signaling packets may include, for example, physical layer overhead data, and acknowledgment (ACK) data communicated between stations. Of particular significance among signaling packet information exchanged between pairs of stations are the REQUEST and PERMIT fields that are short special messages of fixed size that are generated and transmitted only in specific situations.

Figures 3, 5:
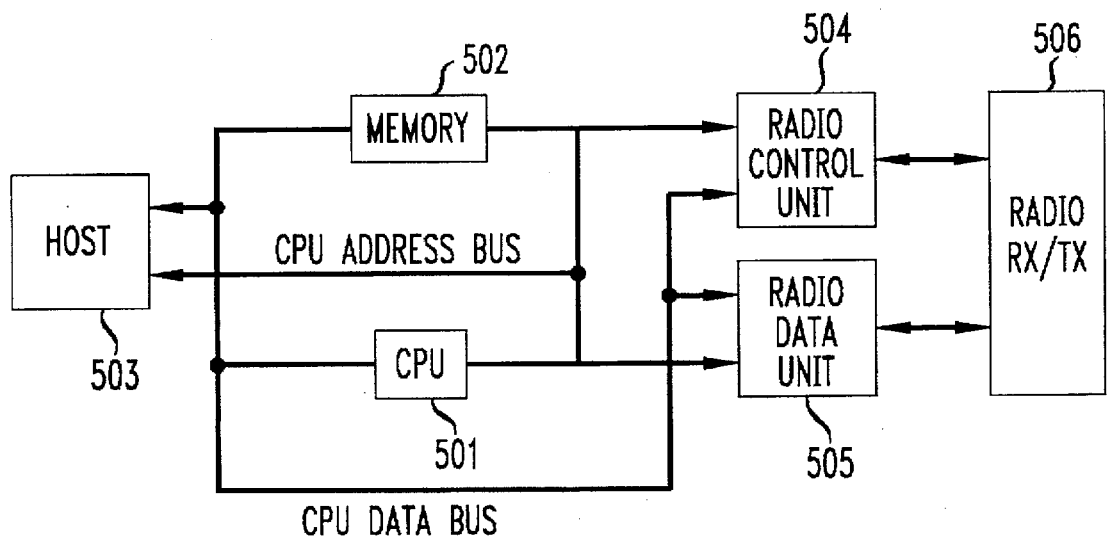
FIG. 3 depicts different sub-fields that may be included in REQUEST and PERMIT signaling messages.
FIG. 5 is a block diagram of an interface module which allows a station to transmit and receive information from another station in a collision-free manner in accordance with the principles of the invention.

Shown in the table of FIG. 3 are different sub-fields that may be included in the REQUEST and PERMIT fields. Because the REQUEST and PERMIT fields constitute almost irreducible overhead, they must be as short as possible. For example, if the addressing space for the wireless network of FIG. 1 is carefully managed, the addresses that are represented in FIG. 3 by the Send_id and the Receive_id sub-fields, may be limited to about 10 bits. Power levels shown in FIG. 3 as Current_Power and Net_Maximum_Power (described in detail below in conjunction with FIG. 4) may be represented with sufficient accuracy with 6 bits (allowing 128 dB of range with 2 dB resolution). Similarly, the length of a packet can represented with 6 bits. With these values, the REQUEST and PERMIT fields may be as short as 38 and 44 bits, respectively. It would be appreciated that other sub-fields might be included in the REQUEST and PERMIT fields. For example, in multimedia applications which mix delay-tolerant and delay-intolerant packets, other sub-fields may be included in the request field to invoke input-priority mechanisms for providing time-bounded services within the distributed-control peer-to-peer wireless network of FIG. 1.

Figure 2:
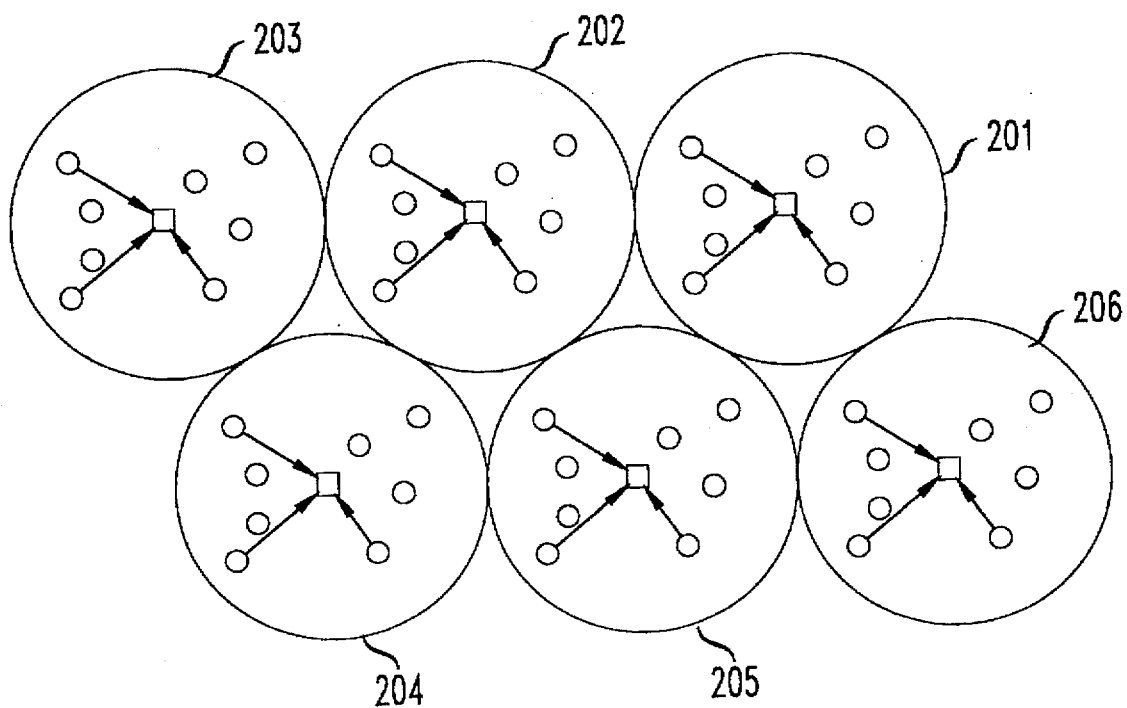
FIG. 2 is a multi-cell, base-station oriented wireless network that is arranged in accordance with the principles of the invention.

FIG. 2 illustrates a multi-cell, base-station-oriented wireless network that is arranged in accordance with the principles of the invention to allow collision-free communications between stations of different cells. Shown in FIG. 2 are cells 201 to 206 that illustrate radio coverage areas served by respective base stations represented in FIG. 2 by small squares at the center of each cell. The base stations serve mobile end-user devices represented in FIG. 2 by circles. Hence, communications between mobile end-user devices associated with different cells may take place through their respective base stations. According to one aspect of the invention, all the base stations are served by a single shared (frequency channel) that is assigned to mobile end-user devices according to either Time-Division Duplex (TDD) or Frequency-Division Half-duplex (FDH) techniques.

In prior art systems, the use of Frequency-Division Duplex (FDD) operation has some advantages (and disadvantages) compared to TDD. For example, FDD avoids base-to-base interference, which can be particularly severe for TDD systems outdoors. FDD is also preferred when low-power, small, inexpensive receivers are used in a wireless network. Receivers with those attributes sometimes limit practical bandwidth available to end-users. For a given maximum bit rate, TDD divides that bit rate between the up-link and down-link, whereas FDD would allow simultaneous use of the maximum bit rate in both directions. Disadvantages of FDD include more complex RF design and fixed partitioning of uplink and downlink bandwidth.

A protocol implementing the principles of the invention may appear to rely on TDD structure because of the "Ping-Pong" nature of the REQUEST-PERMIT-DATA sequence, and because the interference calculations (described below) assume that path losses are reciprocal (the same for both directions of a link). FDD systems generally do not have reciprocal path losses because the two directions of a terminal-base station link operate in different frequencies. So, at any instant the fading values in the two directions will not be perfectly correlated.

In one example implementing the Frequency-Division-Half-Duplex (FHD) technique with the principles of the invention, terminal-to-base and base-to-terminal transmissions are in separate frequencies, but not simultaneous within the same cell. This retains the time-structure of the TDD technique, but avoids the base-to-base interference problem of TDD. FHD operation also appears to waste half the bandwidth, and this is true for a single-cell system. But for multiple cells, the actual waste is less, since interference comes from only same-direction transmissions and will have less impact (allow closer reuse).

In another example of the invention, path-gain instrumentation is used to address the non-reciprocal-path issue. Specifically, when path losses are static, a network can measure path-losses via network-management functions defined for that purpose. For example, receive-level measurements could be made for all packets (not just REQUEST and PERMIT packets) and communicated via network management packets. These proposed enhancements would overcome some of the problems associated with the use FDD and TDD techniques in wireless networks.

Each station in the wireless network of FIGS. 1 and 2 is arranged to perform a number of functions which include the following.

FIG. 4 is a table that shows the different instructions executed by the different elements in FIG. 1 or FIG. 2 to implement the principles of the invention.

1) Whether active-busy or active-idle, each station maintains a power-constraint list which contains each station's knowledge about vulnerable other stations' on-going packets.

2) Each station is arranged to exchange REQUEST/PERMIT signaling packets with another station such that the sending and receiving stations advertise not only identification and packet length, as in standard RTS/CTS, but power levels and other interference-related information. Most important, when a station is a receiving station, it advertises the maximum allowed interference for the expected packet.

3) When a station is an intended receiving station of a packet, it determines whether the packet will be transmitted, and at what power level. The receiving station knows what Signal-to-Interference Ratio (SIR) is required for successful reception of the packet.

4) Each station is arranged to perform path-gain measurement at the end of each (decoded) transmission. The path gain measurement is based on received-signal-strength indication (RSSI) and the advertised transmit power level in the transmitted packet. Each station uses those measurements to predict interference conditions. Current interference measurement at all times is based on RSSI.

FIG. 4 illustrates a table that shows the different instructions executed by the different elements in FIG. 1 or FIG. 2 to implement the principles of the invention. The table of FIG. 4 specifies in detail the operations of a protocol implementing the principles of the invention. Please note that power control is not specified, except that transmission power levels must fall within the constraints of the power constraint list and minimum required power calculations. For illustrative purposes, it is assumed that a simple exemplary contention resolution algorithm, such as ALOHA is implemented with retry delays that double after every failure. It is to be understood however, that use of power control and other sophisticated contention resolution methods is not precluded.

The leftmost column of FIG. 4 shows the operations of a sending station also called a "sender". In this example, stations 10 and 20 are considered sending and receiving stations, respectively. When station 10 wishes to send a packet to station 20, station 10 generates and transits a REQUEST signaling packet to station 20. As mentioned earlier, the REQUEST message may include the following sub-fields SEND_ID, RECEIVE_ID, LENGTH, CURRENT_POWER. The SEND_ID and RECEIVE_ID sub-fields represent the addresses of sending and receiving stations 10 and 20, respectively, while the length sub-field indicates the length (and possibly other attributes) of the packet to be transmitted. The CURRENT_POWER sub-field represents the power at which the REQUEST signaling message is being transmitted, while the NET_MAXIMUM_POWER sub-field is indicative of the threshold power level at which sending station 10 is able to transmit. The REQUEST message itself is sent at or below the net_maximum_power value. If this is less than the minimum possible transmit power of sending station 10, then station 10 must defer. After transmitting the REQUEST signaling message, sending station 10 initiates a timer and awaits a PERMIT response from station 20. If the timer expires before the PERMIT response is received, then station 10 re-transmits the REQUEST signaling message.

The middle column of FIG. 4 describes the functions performed by receiving station 20 also called "receiver" 20. Upon receiving the REQUEST signaling message from station 10, receiving station 20 first determines the current_interference_level, using, for example, some combination of RSSI levels received just before and/or just after the REQUEST. Receiving station 20 then calculates the sender_path_gain from the RSSI during the REQUEST and the transmit power advertised in the REQUEST. Thereafter, receiving station 20 determines the required signal level so that the SIR required for this packet is met, and calculates the required transmit power for sending station 10.

If the required sender transmit power is no more than the net_maximum_power value advertised in the REQUEST signaling message, then packet transmission is allowed. Accordingly, receiving station 20 composes a PERMIT signaling packet which includes, as shown in FIG. 2 the following sub-fields: SEND_ID, RECEIVE_ID, LENGTH, CURRENT_POWER, PRESCRIBED_POWER, MAX_INTERFERENCE. The PERMIT signaling message includes sending and receiving stations 10 and 20 respective addresses and the packet length. Also included in the PERMIT signaling message is the prescribed_power level which must fall between the required and maximum values. The maximum_allowed_interference level at receiving station 20 is based on the prescribed transmit power, sender path gain, and SIR requirement. The PERMIT itself must be transmitted at no more than receiving station 20 own net_maximum_power value, and includes the transmit power level. Examples of illustrative calculations performed by receiving station 20 are shown in the box below:

$$\text{sender\_path\_gain} = \frac{\text{request\_level}}{\text{REQUEST:current\_power}}$$

$$\text{required\_signal\_level} = \text{required\_sir*current\_interference\_level}$$

$$\text{required\_power} = \frac{\text{required\_signal\_level}}{\text{sender\_path\_gain}}$$

$$= \frac{\text{required\_sir*current\_interference\_level*REQUEST:current\_power}}{\text{request\_level}}$$

PERMIT ↔ required_power ≤ REQUEST:net_maximum_power required_power ≤ PERMIT:prescribed_power ≤ REQUEST:net_maximum_power $$\text{max\_allowed\_interference} = \frac{\text{sender\_path\_gain*prescribed\_power}}{\text{required\_sir}}$$

The following example illustrates the calculations performed by receiving station 20 to process a REQUEST from sending station 10. For illustrative purposes, some values were assigned for the request_level, the current_power and the net_maximum power in the REQUEST signaling message, while a signal-to-interference ratio value of 10 db was selected for the required_sir. Those values are shown in the box below under the ASSUMPTIONS header.

Sender-to-3rd party path gain. It is also assumed the presence of a static channel, that is, that the path gain at the time of the calculation is the same as it would be at a putative future transmission time. The assumptions may be removed by including an additional margin in the calculation of max_power. Exemplary calculations performed by a third party station are shown in the box below.

ASSUMPTIONS:
request_level = −70 dBm = $10^{-10}$ watt
REQUEST:current_power = 10 dBm = $10^{-2}$ watt
REQUEST:net_maximum_power = 1 dBm = $10^{-3}$ watt
required_sir = 10 dB = 10
current_interference_level = 100 dBm = $10^{-13}$ watt

THEN $$\text{sender\_path\_gain} = \frac{10^{-10}\text{watt}}{10^{-2}\text{watt}} = 10^{-8} \text{ watt}$$

required_signal_level = 10*$10^{-13}$ watt = $10^{-12}$ watt $$\text{required\_power} = \frac{10^{-12}\text{watt}}{10^{-8}} \; 10^{-4} \text{ watt}$$

PERMIT ↔ $10^{-4}$ watt ≤ $10^{-3}$ watt, so the PERMIT will be sent.

$10^{-4}$ watt ≤ PERMIT:prescribed_power ≤ $10^{-3}$ watt
SUPPOSE we pick
PERMIT:prescribed_power = $10^{-3}$ watt

THEN $$\text{max\_allowed\_interference} = \frac{10^{-8}*10^{-3}\text{watt}}{10} \; 10^{-12}\text{watt} = -90 \text{ dBm}$$

The rightmost column of FIG. 4 shows the operations of a 3rd party station (station 40, for example) that decodes the PERMIT signaling message. Third party station 40 measures $$\text{receiver\_path\_gain} = \frac{\text{permit\_level}}{\text{PERMIT:current\_power}}$$

$$\text{max\_power} = \frac{\text{PERMIT:maximum\_allowed\_interference}}{\text{receiver\_path\_gain}}$$

$$= \frac{\text{PERMIT:maximum\_allowed\_interference} \times \text{PERMIT:current\_power}}{\text{permit\_level}}$$

a receiver_path_gain based on an RSSI during the PERMIT and the current transmit level. Thereafter, third party station 40 calculates a max_power based on the receiver_path_gain and maximum_allowed_interference level. Subsequently, third party station 30 calculates an expiry_time based on the advertised packet length and the time required for an acknowledgment.

For this calculation, it is assumed for the sake of clarity that the 3rd-party-to-Sender path gain is the same as the In one implementation of the principles of the invention, the 3rd party station 40 may add the entry (max_power, expiry_time) to its power constraint list, and if necessary, update the net_maximum_power value. An option that may be more efficient is to add only non-dominated entries to the list and to delete newly-dominated entries.

In the graph shown below, the new entry (depicted by the dashed lines) dominates another entry (depicted by the dotted lines) since it is more restrictive and expires later. The dominated entry is deleted. The new entry is not itself dominated by any remaining entry. The new entry has no effect on the net_maximum_power at the moment, since a more restrictive entry is still in force.

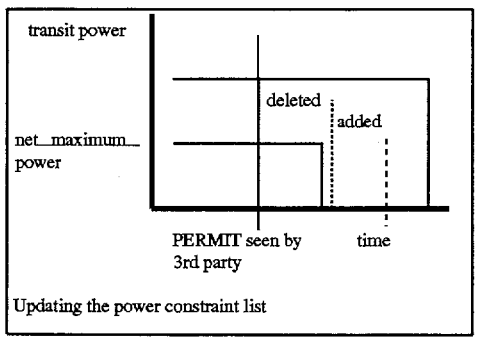

Updating the power constraint list

When sending station 10 receives a PERMIT signaling message in response to its previously transmitted REQUEST signaling message, sending station 10 then transmits its data packet at the power level prescribed in the PERMIT message. If the PERMIT signaling message is not received before a time-out occurs, then sending station 10 must defer. After transmitting a DATA packet sending station 10 sets a timer and waits for an ACK message from receiving station 20. If a Time-out occurs before the ACK is received, sending station 10 must defer. If the ACK is received, the packet has been successfully sent.

After receiving station 20 has issued a PERMIT message (in response to a REQUEST) and received a correct data packet, receiving station 20 then transmits an ACK message to confirm correct reception. The ACK message should be transmitted at no greater than receiving station 20's current net_maximum_power value.

According to an aspect of the invention, when sending station 10 defers due to a time-out, the Sending station may take a random delay and then start the transmission process from the beginning. After each deferral, the average of the random delay may be doubled. After a successful packet the average of the random delay is reset to the nominal value.

In summary, the REQUEST-PERMIT exchange of the protocol accomplishes several objectives: a) it avoids collision by preventing many packets that would not reach their intended destination (because of interferences) from being transmitted, and b) it advertises the information that other stations can use to avoid interfering with a data packet being transmitted without unnecessary deferrals.

FIG. 5 is a block diagram of an interface module which allows a station to transmit and receive information from another station in a collision-free manner in accordance with the principles of the invention. Shown in FIG. 5 are components of the interface module which include a CPU 501, a memory 502, a host 503, a radio control unit 504, a radio data unit 505 and a radio transmitter and receiver 506. CPU 501 is a general processor that includes an Arithmetic logic unit that is arranged to execute the instructions that are shown in FIG. 4 and stored in memory 502. Execution of these instructions by CPU 501 allows the power calculations described above to be performed in order to implement the principles of the invention. Information transmitted by the interface module originates from host 503 and reaches the module via the CPU address bus. Host 503 may also be a base station such as one of the base stations shown in FIG. 2. Radio control 504 is designed to assess received-signal-strength indication, and notify CPU 501, as appropriate. Radio data unit 504 modulates signals received from CPU 501 to make them suitable for transmission over the radio transmitter 506. Conversely, radio signals received from radio receiver 506 are modulated into suitable format by radio data unit 504 for transmission to CPU 501 or host 503.

The foregoing is to be construed as only being an illustrative embodiment of the principles of this invention. Persons skilled in the art can easily conceive of alternative arrangements providing functionality similar to this embodiment without any deviation from the fundamental principles or the scope of this invention.

The invention claimed is:

1. A method of communicating information via a wireless network, said method comprising the steps of:
broadcasting over a wireless communications channel a first signaling message from a first end-user communications device which is coupled to a wireless network, said signaling message including a request to transmit at least one data packet to a second communications end-user device which is also coupled to said wireless network, said request including data indicative of an upper power level at which said first end-user communications device is able to transmit said at least one data packet;
in response to said second end-user communications device receiving said first signaling message, determining permission parameters for said at least one data packet to be transmitted by said first end-user communications device, said permission parameters including a prescribed power level for transmission of said at least one data packet;
broadcasting from said second end-user communications device a second signaling message via said communications channel, said second signaling message including said permission parameters; and
in response to said first end-user communications device receiving said second signaling message, transmitting from said first end-user communications device said at least one data packet based on said prescribed power level.

2. The method of claim 1 wherein said permission parameters include an upper interference signal level above which at least one other end-user communications device which is connected to said wireless network, is forbidden during said transmission of said at least one data packet to broadcast information via said wireless communications channel.

3. The method of claim 1 further comprising the steps of:
starting a timer at said first end-user communications device after broadcasting said first signaling message; and
broadcasting a subsequent request to transmit said at least one data packet when said timer expires before said second signaling message is received at said first end-user communications device.

4. The method of claim 1 further comprising the steps of:
transmitting from said second end-user communications device an acknowledgment message when said at least one data packet is received at said second end-user communications device, said acknowledgment message being destined for said first end-user communications device.

5. The method of claim 1 further comprising the steps of:
stating a timer at said first end-user communications device after said first end-user communications device has transmitted said at least one data packet; and
re-transmitting said at least one data packet when said timer expires before an acknowledgment message that is indicative of reception of said at least one data packet at said second end-user communications device, is received from said second end-user communications device.

6. The method of claim 1 wherein said first signaling message includes in addition to said upper power level, data indicative of a) addresses of said first and second end-user communications devices b) a length of said at least one data packet to be transmitted and c) the present power level at which said first signaling message is being broadcasted.

7. The method of claim 1 wherein said second signaling message includes in addition to said permission parameters data indicative of a) addresses of said first and second end-user communications devices b) a length of said at least one data packet to be received and c) the present power level at which said second signaling message is being broadcasted.

8. The method of claim 2 further comprising the steps of:
monitoring at said at least one other end-user communications device said first and second signaling messages and said at least one data packet exchanged between said first and second end-user communications devices; and building at said at least one other end-user communications device a power constraint list for use by said at least one other end-user communications device in future transmission of data in a collision-free manner.

9. The method of claim 8 wherein said power constraint list includes data indicative of a particular time at which said transmission of said at least one data packet is scheduled to end.

10. The invention of claim 9 wherein said particular time is calculated based on factors which include a) the length of said at least one data packet to be transmitted, and an mount of time needed for transmission of an acknowledgment signaling message from said second end-user communications device to said first end-user communications device.

11. The invention of claim 9 wherein said power constraint list includes data indicative of an uppermost power level at which data transmission and signaling messages exchanges are currently taking place.

12. The invention of claim 11 further comprising the step of
calculating said uppermost power level based on factors which include a) said threshold interference signal level in said second signaling message, and b) measurement of path gain between said first end-user communications device and said at least one other end-user communications device.

13. A system for communicating information over a wireless network, said system comprising:
a first end-user communications device that broadcasts over a wireless network a request to transmit at least one data packet to a second end-user communications device, said request including data indicative of an upper power level at which said first mobile end-user communications device is able to transmit said at least one data packet;

a processor of said second end-user communications device which receives said request and determines permission parameters for said at least one data packet to be transmitted by said first mobile end-user communications device, said permission parameters including a prescribed power level for transmission of said at least one data packet;

a first transmitter included in said second end-user communications device that forwards a second signaling message to said first mobile end-user communications device, said second signaling message including said permission parameters; and a second transmitter included in said first end-user communications device, responsive to receiving said second signaling message, sends said at least one data packet to said second end-user communications device based on said prescribed power level.

14. The invention of claim 13 said wherein permission parameters include an upper interference signal level above which at least one other end-user communications device which is connected to said wireless network, is forbidden during said transmission of said at least one data packet to broadcast information via said wireless communications channel.

15. The invention of claim 13 wherein said first end-user communications device a) starts a timer after broadcasting said first signaling message; and b) broadcasts a subsequent request to transmit said at least one data packet when said timer expires before said permission parameters are received at said first end-user communications device.

16. The invention of claim 13 wherein said second end-user communications device transmits an acknowledgment message upon receiving said at least one data packet.

17. The invention of claim 13 wherein said first end-user communications device a) starts a timer after transmitting said at least one data packet; and b) re-transmits said at least one data packet when said timer expires before an acknowledgment message is received from said second end-user communications device.

18. The invention of claim 13 wherein said first signaling message includes in addition to said upper power level, data indicative of a) addresses of said first and second end-user communications devices b) a length of said at least one data packet to be transmitted and c) the present power level at which said first signaling message is being broadcasted.

19. The invention of claim 13 wherein said second signaling message includes in addition to said permission parameters, data indicative of a) addresses of said first and second end-user communications devices b) a length of said at least one data packet to be transmitted, and c) the present power level at which said second signaling message is being broadcasted.

20. The invention of claim 14 wherein said at least one other end-user communications device
monitors a) said signaling messages being exchanged between said first and second end-user communications devices, and b) said at least one data packet being sent from said first end-user communications device to said second end-user communications device; and generates a power constraint list for use to transmit data at a later time in a collision-free manner.

21. The invention of claim 20 wherein said power constraint list includes data indicative of a particular time at which said transmission of said at least one data packet is scheduled to end.

22. The invention of claim 21 wherein said particular time is calculated based on factors which include a) the length of said at least one data packet to be transmitted, and b) an amount of time needed for transmission of an acknowledgment signaling message from said second end-user communications device to said first end-user communications device.

23. The invention of claim 20 wherein said power constraint list includes data indicative of an uppermost power level at which data transmission and signaling messages exchanges are currently taking place.

24. The invention of claim 23 wherein said at least one other end-user device calculates said uppermost power level based on factors which include a) said upper interference level in said second signaling message, and b) measurement of path gain between said first end-user communications device and said at least one other end-user communications device.

25. A method of operating a wireless packet network that serves a plurality of stations, said method comprising the steps of:

exchanging signaling packets between a pair of stations which include a sending station and a receiving station, said signaling messages being exchanged prior to any communications of at least one data packet between said stations, said signaling packets also being exchanged via a communications channel of said wireless packet network and containing information which is included in at least one of said signaling packets, said information comprising a) addresses of said stations b) length of said at least one data packet to be communicated, c) signaling power levels at which said signaling packets are being transmitted d) an upper interference signal level, and e) a prescribed power level at which said at least one data packet is to be communicated; and transmitting said at least one data packet from said sending station to said receiving station when said transmission is able to take place in accordance with said prescribed power level.

26. The invention of claim 25 further comprising the steps of:

exchanging signaling information and data packets between at least one additional pair of stations via said communications channel, said exchange being carded at a power level that is below said upper interference signal level.

27. The invention of claim 25 further comprising the steps of:

storing in an associated memory of each sending and receiving station a power constraint list which includes data indicative of a) a particular time at which said transfer of said at least one data packet is scheduled to end, and b) an uppermost power level at which data transmission and signaling messages exchanges are currently taking place.

28. A wireless packet network that serves a plurality of stations connected thereto, said network comprising:

a transmitter which transmits to a receiving station signaling packets received from a sending station, said transmission being carded out via a communications channel of said wireless packet network in order to facilitate transfer of at least one payload data packet between said stations, wherein information included in at least one of said signaling packets is comprised of a) addresses of said stations b) length of said at least one data packet to be communicated, c) signaling power levels at which said signaling packets are being transmitted d) a upper interference level, and e) a prescribed power level at which said at least one data packet is to be communicated; and a receiver which receives said at least one payload data packet from said sending station and transfers said at least one payload data packet to said receiving station when said transfer is able to take place at said prescribed power level.

29. The invention of claim 28 wherein said wireless packet network facilitates exchange of signaling information and user data between at least one other sending station and at least one other receiving station via said communications channel, said exchange being carried at a power level that is below said upper interference signal level.

30. A method of communicating information via a wireless network, said method comprising the steps of:

receiving at a first device a request-to-transmit message sent by a second device;

in response to receiving said request, broadcasting from said first device at least one transmission power parameter which includes a transmission power level indicative of an upper transmission power level at which said first device is able to transmit; and in response to said broadcasting of said at least one transmission power parameter by said first device, transmitting a message from said second device at substantially said transmission power level.

31. The method of claim 30 wherein said request-to-transmit message includes an upper power level at which said second-end-user device is able to transmit.

32. The method of claim 30 wherein said at least one transmission power parameter includes an upper interference signal level above which at least one other device connected to said wireless network is forbidden to transmit during said transmission of said message by said second device.

33. A wireless system comprising:

a first device which a) receives from a second device a request-to-transmit message, and b) responsive to said request, broadcasts at least one transmission power parameter which includes a transmission power indicative of an upper transmission power level at which said first device is able to transmit; and a circuit of said second device responsive to receiving said at least one transmission power parameter, transmits information to said first device at substantially said transmission power level.

34. The system of claim 33 wherein said request-to-transmit message includes an upper power level at which said second-end-user device is able to transmit.

35. The method of claim 33 wherein said at least one transmission power parameter includes an upper interference signal level above which at least one other device connected to said wireless network is forbidden to transmit during said transmission of said information by said second device.

36. A method of communicating information via a wireless network, said method comprising the steps of:

receiving at a first device a request-to-transmit message sent by a second device;

in response to receiving said request, broadcasting from said first device at least one transmission power parameter which includes a transmission power level; and in response to said broadcasting of said at least one transmission power parameter by said first device, transmitting a message from said second device at substantially said transmission power level wherein, said at least one transmission power parameter includes an upper interference signal level above which at least one other device connected to said wireless network is forbidden to transmit during said transmission of said message by said second device.

37. A wireless system, comprising:

a first device which a) receives from a second device a request-to-transmit message, and b) responsive to said request, broadcasts at least one transmission power parameter which includes a transmission power level; and a circuit of said second device, responsive to receiving said at least one transmission power parameter, transmits a message to said first device at substantially said transmission power level wherein, said at least one transmission power parameter includes an upper interference signal level above which at least one other device connected to said wireless network is forbidden to transmit during said transmission of said message by said second device.

\* \* \* \* \*